United States Patent [19]

Matsui et al.

[11] 4,360,089
[45] Nov. 23, 1982

[54] ELECTRIC ACTUATOR PROVIDED WITH A BRAKE

[75] Inventors: Takeshi Matsui, Aichi; Takaharu Idogaki, Okazaki, both of Japan

[73] Assignee: Nippon Soken, Inc., Nishio, Japan

[21] Appl. No.: 156,088

[22] Filed: Jun. 3, 1980

[30] Foreign Application Priority Data

Jul. 4, 1979 [JP] Japan .................................. 54/84834

[51] Int. Cl.³ .............................................. B60K 41/28
[52] U.S. Cl. ................................ 192/2; 192/3 T; 192/3 G; 180/170; 74/781 R; 74/802; 123/361
[58] Field of Search ............... 192/3 T, 2, 1, 0.033, 192/0.032, 0.03, 3 M, 3 G, 4 A, 9; 123/361; 180/170; 74/781 R, 782, 801, 802

[56] References Cited

U.S. PATENT DOCUMENTS

| | | | |
|---|---|---|---|
| 2,401,256 | 5/1946 | Lear | 192/2 X |
| 3,392,799 | 7/1968 | Ishikawa | 123/361 X |
| 4,212,272 | 7/1980 | Hawk | 123/361 X |

Primary Examiner—George H. Krizmanich
Attorney, Agent, or Firm—Cushman, Darby & Cushman

[57] ABSTRACT

An electric actuator including a stationary housing, an output shaft rotatably supported by the housing, an output member mounted on said output shaft, an electric motor secured to the housing, speed reduction gear mechanism for reducing the rotational speed of the electric motor, differential gear mechanism provided between the output shaft and the speed reduction gear mechanism, an electromagnetic brake operatively connected to the differential gear mechanism. The differential gear mechanism includes an output side differential gear secured to the output shaft, and a brake side differential gear rotatable with a brake plate of the electromagnetic clutch. The electromagnetic brake includes an electromagnetic coil and an electromagnetic yoke secured to the housing, so that when the brake side differential gear is prevented from rotating by the electromagnetic brake the electric motor controls displacement of the output member, and when the brake side differential gear is freely rotatable relative to the housing the output member is freely rotatable irrespective of the rotation of the electric motor.

5 Claims, 2 Drawing Figures

ELECTRIC ACTUATOR PROVIDED WITH A BRAKE

BACKGROUND OF THE INVENTION

This invention relates to an electric actuator provided with a brake and adapted for use with mechanisms such as automatic drive mechanisms for controlling a travelling speed of vehicle at a preset value.

Generally, an automatic drive mechanism serves to automatically drive a throttle link connected to a throttle valve of a vehicle by means of an electric motor, thereby to automatically control the vehicle speed in accordance with instructions from a controller.

An electric actuator for this type of automatic drive mechanism comprises an electric motor, reduction gears for reducing the rotational speed of the electric motor, and a brake for selectively transmitting the output of the reduction gears to the throttle valve of the vehicle to be controlled. As a brake, an electromagnetic brake readily controllable by an electrical output are conventionally used. Such electromagnetic brake includes a coil bobbin enclosed by an electromagnetic yoke formed in two pieces, and an electromagnetic coil wound around the coil bobbin. Since the electromagnetic coil is rotated by the reduction gears, it has hitherto been necessary to energize the electromagnetic coil through slip-ring type contacts.

Such type of automatic drive mechanism has disadvantages such that the slip-ring type contacts may give rise to a contact failure and also that the construction of the automatic drive mechanism becomes complicated.

SUMMARY OF THE INVENTION

It is an object of the present invention to eliminate the above-mentioned drawbacks inherent in electromagnetic brake having a slip ring or other brakes of complex construction.

According to the invention, there is provided an electric actuator which comprises a brake assembly of simple construction including a movable member rotatable relative to a housing, and a rotation preventing means fixedly secured to the housing, and in which a member to be controlled can be moved to any position as desired by the output of an electric motor and can be also moved freely by an external operating force (such as manually) other than by the electric motor during rotation thereof.

DESCRIPTION OF THE PREFERRED EMBODIMENT

Figure 1:
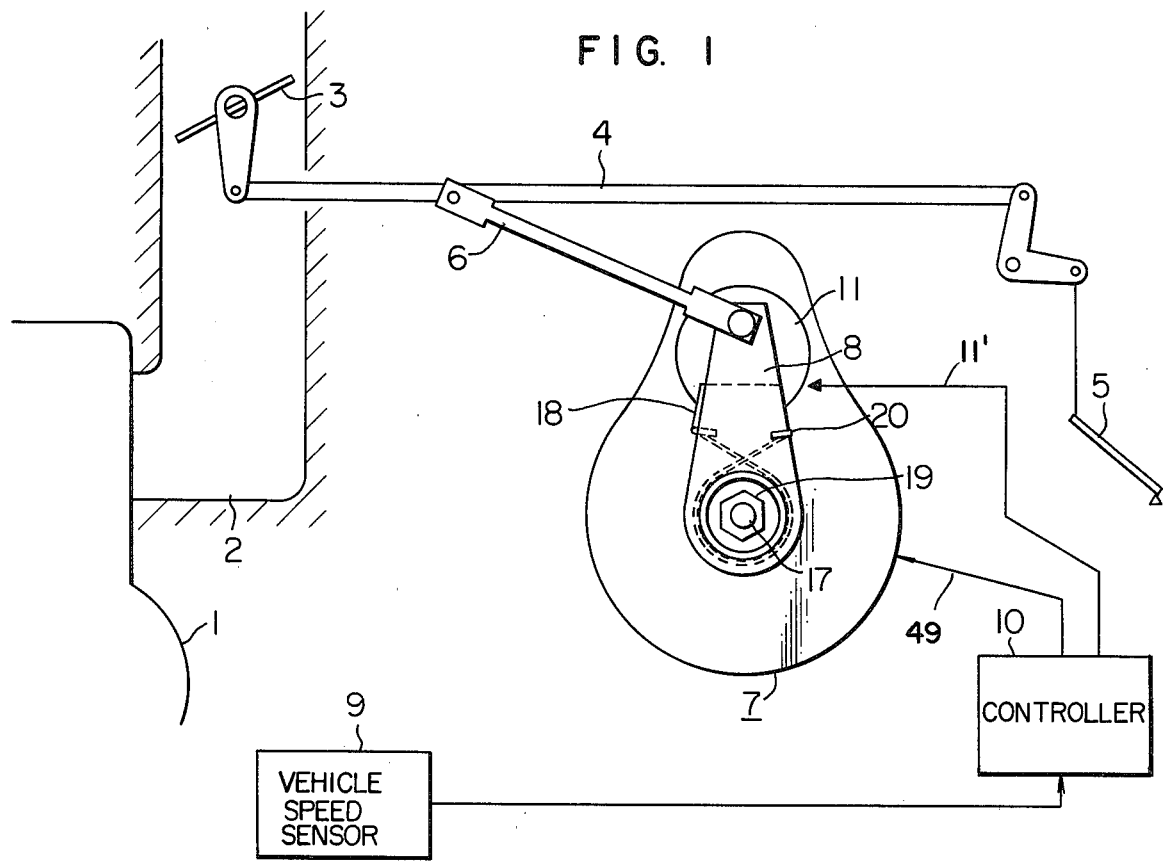
FIG. 1 is a schematic view of an automatic drive mechanism incorporating therein an electric actuator according to the invention.

FIG. 1 schematically shows an automatic drive mechanism incorporating therein an electric actuator 7 according to an embodiment of the invention. Referring to FIG. 1, a throttle valve 3 is provided in an intake pipe 2 of an automotive vehicle engine 1 and is connected via a throttle link 4 to an accelerator pedal 5. Thus when the driver of the automotive vehicle presses down the throttle pedal by foot, the opening degree of the throttle valve 3 can be changed.

The throttle link 4 is connected at its intermediates portion to a connecting rod 6 which in turn is connected to an arm 8 of the electric actuator 7.

The travelling speed of the automotive vehicle is detected by a vehicle speed sensor 9 whose output is supplied to a controller 10. The controller 10 has on-off control of an electric motor 11 in the electric actuator 7 and also serves to control a brake assembly (12 in FIG. 2) in the electric actuator 7.

Thus the throttle valve 3 is automatically driven in response to commands from the controller 10 to thereby automatically control the vehicle speed of the automotive vehicle.

Figure 2:
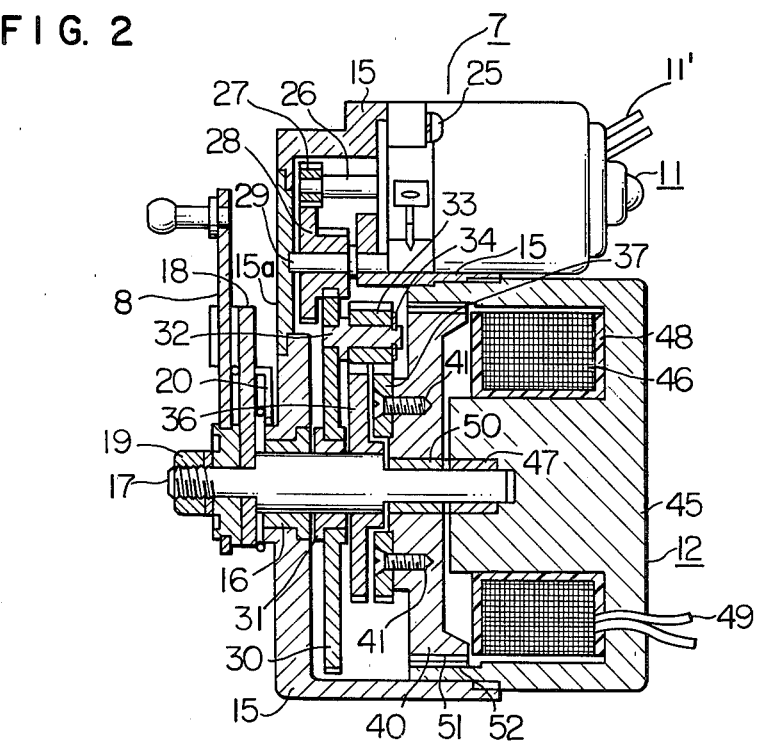
FIG. 2 is a sectional view of an electric actuator according to the invention.

Referring to FIG. 2, there is shown the electric actuator 7. A housing 15 is secured to a vehicle body (not shown) of the automotive vehicle, and a bearing 16 is force-fitted in the housing 15 for supporting an output shaft 17 for rotation relative to the housing 15. The output shaft 17 mounts thereto an arm stopper 18 which rotates therewith. The arm 8 is rotatably mounted on the output shaft 17 by a nut 19. A spring 20 is mounted between the arm stopper 18 and the output shaft 17 to urge the arm stopper 18 against the arm 8 at all times. The output shaft 17 is journalled at the other end thereof by a bearing 47 in an electromagnetic yoke 45 subsequently to be described.

The electric motor 11 serves as a power source for the electric actuator and is secured to the housing 15 by screws 25. Lead wires 11' connect the motor 11 to an electric circuit in the controller 10. Driving power of the electric motor 11 is transmitted to the brake assembly 12 via speed reduction gear means and differential gear means. The speed reduction gear means comprises a pinion 27 and a spur gear 28. The pinion 27 is secured to an output shaft 26 of the electric motor 11, and the spur gear 28 is secured to a shaft 29 which is rotatably journalled by the housing 15 and a center plate 15a secured thereto. In this embodiment, the ratio of the number of revolutions of the output shaft 26 of the electric motor 11 to the number of revolutions of a drive gear 30 of the differential gear means is 20. The differential gear means includes a differential pinion 33, an output side differential gear 36 and a brake side differential gear 37 in addition to the drive gear 30.

Driving power of the electric motor 11 is reduced in its speed by the speed reduction gears 27, 28 to be transmitted to the drive gear 30. The drive gear 30 is secured to a bearing 31 which is supported by the output shaft 17. The differential pinion 33 is rotatably supported through a washer 34 by a stub shaft 32 which in turn is secured to the drive gear 30. The differential gear 33 and the brake side differential gear 37 are both in the form of sun gears. The output side differential gear 36 is secured to the output shaft 17 for rotation therewith as a unit at a first rotational output. The brake side differential gear 37 is secured by screws 41 to a brake plate 40 of the brake assembly 12 and is rotatable relative to the output shaft 17 at a second rotational output by means of a bearing 50 in the brake plate 40.

The output side differential gear 36 and brake side differential gears 37 are both in the form of shifted gear and are different by one in number of teeth from each other in this embodiment. For example, the gear ratio is 50 versus 49. Thus when the differential pinion 33 makes one complete revolution around the sun gears 36 and 37 while rotating on its own axis, the two sun gears 36 and 37 are angularly displaced relative to each other through an angle (7.2° in the illustrated embodiment)

corresponding to the difference in number of teeth (which is 1 in this embodiment). The two differential gears 36 and 37 and differential pinion 33 constitute the differential gear means 33, 36 and 37 known as Furgusson mechanical paradox mechanism.

It is to be understood that the differential gear means can be alternatively constituted by mechanical components other than shifted gears or Furgusson mechanical paradox mechanism. For example, planetary differential gear means including straight bevel gears may be used which eliminates slippage of tires and bad effects on control of the vehicle by causing differential operation of two shafts when there is a difference in rotational speeds between the driving wheels.

The brake assembly 12 in the form of electromagnetic brake includes the movable brake plate 40, the electromagnetic yoke 45 and an electromagnetic coil 46 serving as means for preventing the brake plate 40 from rotating. The electromagnetic yoke 45 is formed with an annular recess and is secured to the housing 15 at its outer peripheral portion. The yoke 45 is also formed at its inner peripheral portion with a plurality of gear-shaped projections 52. Received in the annular recess of the electromagnetic yoke 45 is a coil bobbin 48 on which the electromagnetic coil 46 is wound. The terminal ends of the electromagnetic coil 46 are connected through lead wires 49 to an electric circuit in the controller 10 as shown in FIG. 1.

The brake plate 40 is fitted at its center portion with a bearing 50 to be rotatable relative to the output shaft 17. The brake plate 40 is formed of ferromagnetic material and is formed at the entire outer peripheral portion with a plurality of gear-shaped projections 51. The projections 51 on the brake plate 40 face the projections 52 of the electromagnetic yoke 45 with air gap therebetween. With the arrangement, upon energization of the electromagnetic coil 46 magnetic fluxes flow between the gear-shaped projections 51 and 52 to produce magnetic attraction therebetween, so that the brake plate 40 and the electromagnetic yoke 45 and hence the housing 15 act as a unit magnetically to make the brake plate 40 non-rotatable.

It is to be understood that a conventional electromagnetic brake which utilizes a frictional force may be used as the brake assembly 12.

Brakes other than electromagnetic brakes may be used as the brake assembly 12. For example, brakes may be used which include a movable member and a friction member adapted to be biased thereagainst by hydraulic or pneumatic pressures. These particular brakes can serve as rotation preventing means according to the invention. For example, a hydraulic drive mechanism may be mounted on the housing to be stationary and simple in construction.

Operation of the embodiment of the aforesaid construction will now be described. When it is not necessary to automatically operate the throttle valve 3 or when the automatic drive mechanism is not actuated, the controller 10 in FIG. 1 does not send an electric current to the electromagnetic coil 46 of the electromagnetic brake assembly 12, so that the brake plate 40 is free to rotate. Therefore, the arm 8 moves pivotally in accordance with the operation of the throttle pedal 5 and the throttle link 4 by the driver. That is, the arm 8 is moved by an external force to rotate the output shaft 17 and the output side differential gear 36. Rotation of the output side differential gear 36 causes the planetary gear 33 to rotate about its own axis and mesh with the brake side differential gear 37 for rotation therewith. Accordingly, the brake plate 40 secured to the brake side differential gear 37 is caused to rotate on the output shaft 17. That is, the brake plate 40 freely rotates as the throttle link 4 is moved.

Operation of the embodiment shown in FIGS. 1 and 2 will be described when the automatic drive mechanism is rendered operative. First, when the automotive vehicle runs at constant vehicle speed, the vehicle speed sensor 9 outputs a signal to the controller 10 when the vehicle speed reaches a speed level set by the driver. The controller 10 sends an electric current to the electromagnetic coil 46 to energize the same, thereby preventing rotation of the brake plate 40. Thus the throttle valve 3 is immobilized by the throttle link 4, and the automotive vehicle continues to run at the predetermined speed level.

As the motor vehicle runs uphill in this condition, the vehicle speed deviates from the set speed. In this case, the controller 10 sends an electric current to the electric motor 11 to rotate the same in the normal or reverse direction while an electric current is being passed to the electromagnetic coil 46. Actuation of the motor 11 rotates the pinion 27 mounted on the output side of the motor 11, thereby rotating the spur gear 28 and differential gear 30. As the differential gear 30 rotates, the planetary gear 33 (differential pinion) on the stub shaft 32 secured to the differential gear 30 moves around the output side differential gear 36 and brake side differential gear 37 while rotating on its own axis.

In this case, since the brake plate 40 is prevented from rotating by the energization of the electromagnetic brake assembly 12, the brake side differential gear 37 does not rotate. Therefore, the output side differential gear 36 differentially rotates relative to the brake side differential gear 37 in stationary condition, as the planetary gear 33 orbits around the gears 36 and 37 while rotating on its own axis. As aforesaid, the two sun gears 36 and 37 are different in number of teeth from each other, so that the gear 36 differentially rotates through an angle corresponding to the difference in number of teeth. Rotation of the output side differential gear 36 results in rotation of the output shaft 17 force-fitted and secured therein.

Thus the electric motor 11 is driven by the command from the controller 10 and the throttle valve 3 is operated through the arm 8 of the electromagnetic actuator 7 to correct the vehicle speed at a set value. The rotation preventing means 45, 46 of the brake assembly 12 constructed in the manner as described above is secured to the housing 15 and hence to the vehicle body, which eliminates the need of slip-ring type contacts.

The electric actuator according to the invention can be applied to devices other than automatic drive mechanisms.

From the foregoing description, it will be appreciated that the brake assembly according to the invention is very simple in construction, so that the electric actuator can be free from trouble and economical. Also, according to the invention, the differential gear means includes a drive gear, a differential pinion and two differential gears, so that the electric actuator is simple in construction and low in cost and yet provides a sufficiently high output at reduced speeds.

What is claimed is:

1. An electric actuator having an output member secured to an output shaft and adapted to be alternatively driven either by means of an electric motor or by external operating means, comprising:

speed reduction gear means for reducing the rotational speed of said electric motor;

differential gear means interposed between said output shaft and said speed reduction gear means and having first and second gears which perform differential rotation;

a brake assembly operatively connected to the second gear of said differential gear means;

wherein when the brake assembly is operative to stop the rotation of said second gear the rotation of said electric motor is transmitted to the output shaft via said speed reduction gear means and said differential gear means, and when said brake assembly is inoperative to free said second gear the output member can be freely operated by said external operating means.

2. An electric actuator comprising:

an output member;

an output shaft mounting thereto said output member and supported for rotation relative to a housing;

a drive gear rotatably supported by said output shaft for rotation at reduced speeds by the rotational force of an electric motor connected thereto;

a differential pinion mounted on said drive gear with its axis of rotation eccentric relative to the axis of rotation of said drive gear for rotation on its own axis and orbital movement;

an output side differential gear secured to said output shaft for meshing with said differential pinion;

a brake side differential gear provided coaxially with said output side differential gear for meshing with said differential pinion; and a brake assembly for selectively connecting said brake side differential gear to said housing to prevent said brake side differential gear from rotating;

said brake assembly including:

a movable member for rotation with said brake side differential gear and rotation preventing means secured to said housing for selectively preventing said movable member from rotating, whereby when said brake side differential gear is prevented from rotating by said brake assembly said electric motor controls displacement of the output member, and when said brake side differential gear is freely rotatable relative to said housing said output member can be displaced irrespective of the rotation of said electric motor.

3. An electric actuator as claimed in claim 2 wherein said differential pinion is a planetary gear, and said output side and brake side differential gears are sun gears.

4. An electric actuator as claimed in claim 2 wherein said brake assembly comprises an electromagnetic brake, and said rotation preventing means comprises an electromagnetic coil secured to said housing.

5. An electric actuator as claimed in claim 3 wherein said brake side differential gear and said output side differential gear are different in number of teeth from each other, and said two differential gears and said differential pinion constitute the Furgusson mechanical paradox mechanism.

* * * * *